United States Patent
Hulldin et al.

(10) Patent No.: US 6,552,310 B1
(45) Date of Patent: Apr. 22, 2003

(54) HEATING CABLE MAT AND METHOD FOR MANUFACTURING A HEATING CABLE MAT

(75) Inventors: Roland Hulldin, Hindas (SE); Micael Karlsson, Hinda (SE)

(73) Assignee: Raychem HTS Nordic AB, Hindas (SE)

( * ) Notice: Subject to any disclaimer, the term of this patent is extended or adjusted under 35 U.S.C. 154(b) by 0 days.

(21) Appl. No.: 09/807,450

(22) PCT Filed: Sep. 9, 1999

(86) PCT No.: PCT/SE99/01566

§ 371 (c)(1),
(2), (4) Date: Jul. 9, 2001

(87) PCT Pub. No.: WO00/25069

PCT Pub. Date: May 4, 2000

(30) Foreign Application Priority Data

Oct. 14, 1998 (SE) ................................................ 9803533

(51) Int. Cl.⁷ ................................................. H05B 3/54
(52) U.S. Cl. ........................ 219/528; 219/541; 219/217
(58) Field of Search ................................ 219/528, 529, 219/532, 544, 548, 549, 541, 217; 338/208, 259, 283, 284, 291; 392/432, 435

(56) References Cited

U.S. PATENT DOCUMENTS

| | | | | |
|---|---|---|---|---|
| 3,976,855 A | * | 8/1976 | Altmann et al. | 219/532 |
| 4,056,420 A | | 11/1977 | Adams | |
| 4,990,744 A | * | 2/1991 | Willner | 219/213 |
| 5,908,573 A | * | 6/1999 | Chiles et al. | 219/545 |
| 5,998,770 A | * | 12/1999 | Sundby | 219/528 |
| 6,184,496 B1 | * | 2/2001 | Pearce | 219/213 |
| 6,294,768 B1 | * | 9/2001 | Liebich | 219/528 |

FOREIGN PATENT DOCUMENTS

| | | |
|---|---|---|
| DE | A1-4136019 | 5/1992 |
| DE | C1-19641179 | 5/1998 |
| FR | 2324187 | 4/1977 |
| FR | 2642929 | 8/1990 |
| GB | 1017160 | * 1/1966 |

* cited by examiner

Primary Examiner—Teresa Walberg
Assistant Examiner—Vinod D. Patel

(57) ABSTRACT

The invention relates to a heating cable mat (1) comprising a net-shaped supporting element (2) and a heating cable (4) which is arranged on the supporting element. The surface (3) of the supporting element is adhesive, and the heating cable (4) is arranged in abutment against the supporting element (2). To further fix the heating cable (4), a second net-shaped supporting element (10) is arranged adjacent to the heating cable mat so that the heating cable (4) is located between the two supporting elements (2, 10).

17 Claims, 3 Drawing Sheets

HEATING CABLE MAT AND METHOD FOR MANUFACTURING A HEATING CABLE MAT

This application is the national phase under 35 U.S.C. §371 of PCT International Application No. PCT/SE99/01566 which has an International filing date of Sep. 9, 1999, which designated the United States of America.

TECHNICAL FIELD

The invention relates to a heating cable mat comprising a supporting element of a foraminous, flexible material and a heating cable which is arranged on the supporting element.

The invention also relates to a method for manufacturing such a heating cable mat.

TECHNICAL BACKGROUND

When installing electric floor heating, a heating cable is placed on a base, usually directly on the available, underlying material in the premises, for instance concrete. The cable is fixed to the base in a predetermined pattern to ensure the proper distance between the lengths of cable, thus obtaining the intended effect per square meter of floor. Subsequently, the cable is covered with putty material which permanently fixes the cable in the predetermined pattern and which distributes irregular loads on the cable. The flooring desired in the premises, for instance glazed tiles or clinkers, is then laid on the putty.

If the underlying material is plastic, wood or some other inflammable material, it is necessary to apply a non-flammable layer beneath the heating cable. This layer usually has the form of a net, for instance, made of fibreglass or a non-flammable plastic material. Furthermore, the net may be used to fix the heating cable in the intended pattern, for example by attaching the cable to the net with the aid of clips or bands.

Attaching the cable to the base or the net is often time-consuming and constitutes a difficult operation when installing floor heating. Thus, it has been known for some time to prefabricate a heating cable mat of the type stated by way of introduction which consists of a net with a cable arranged thereon. In connection with the installation the cable mat can easily be unrolled in the intended room. The cable has already been arranged adjacent to the net in a predetermined pattern, for instance in a serpentine pattern.

According to prior art technique, the cable is attached to the net with tape or bands applied to one side or both sides of the net in the longitudinal direction of the cable mat. In one embodiment, three parallel strips of tape extend along the cable mat, and consequently, keep the cable in position.

This implies a relatively complicated prefabrication process where the cable has to be kept in position adjacent to the net to allow the tape to be applied and fix the cable.

Moreover, the tape represents a problem when installing the cable mat. The putty material which is applied to secure the mat to the base cannot penetrate the tape and, therefore, there is a risk of air pockets forming under the net. This results in insufficient contact between the base and the flooring arranged on the putty, which may cause cracks or irregular tension in the floor.

SUMMARY OF THE INVENTION

The object of the present invention is thus to provide a heating cable mat for easy installation of floor heating, which at the same time can be easily manufactured.

A second object of the invention is to provide a heating cable mat which satisfactorily lets through putty material in connection with the installation.

According to the invention, these objects are obtained by a heating cable mat of the type stated by way of introduction, in which the surface of the supporting element is adhesive.

This allows a simple provision of a heating cable adjacent to the supporting element so that the prefabrication can take place quickly and efficiently.

The supporting element preferably comprises a net made of, for instance, a soft plastic material. This means that the heating cable mat will be bendable and flexible and in a satisfactory manner lets through putty material which is applied thereto.

An additional foraminous, self-adhesive supporting element may be arranged adjacent to the heating cable so that the heating cable is located between two supporting elements. This means that the heating cable is fixed between the supporting elements and reduces the risk of unintentionally moving out of its position.

This second supporting element may, where appropriate, have a substantially smaller extent than the first supporting element and may comprise, for instance, one or more strips which extend along the heating cable mat.

BRIEF DESCRIPTION OF THE DRAWINGS

In the following, a preferred embodiment of the invention will be described in more detail with reference to the accompanying drawings, in which.

DESCRIPTION OF A PREFERRED EMBODIMENT

Figure 1:
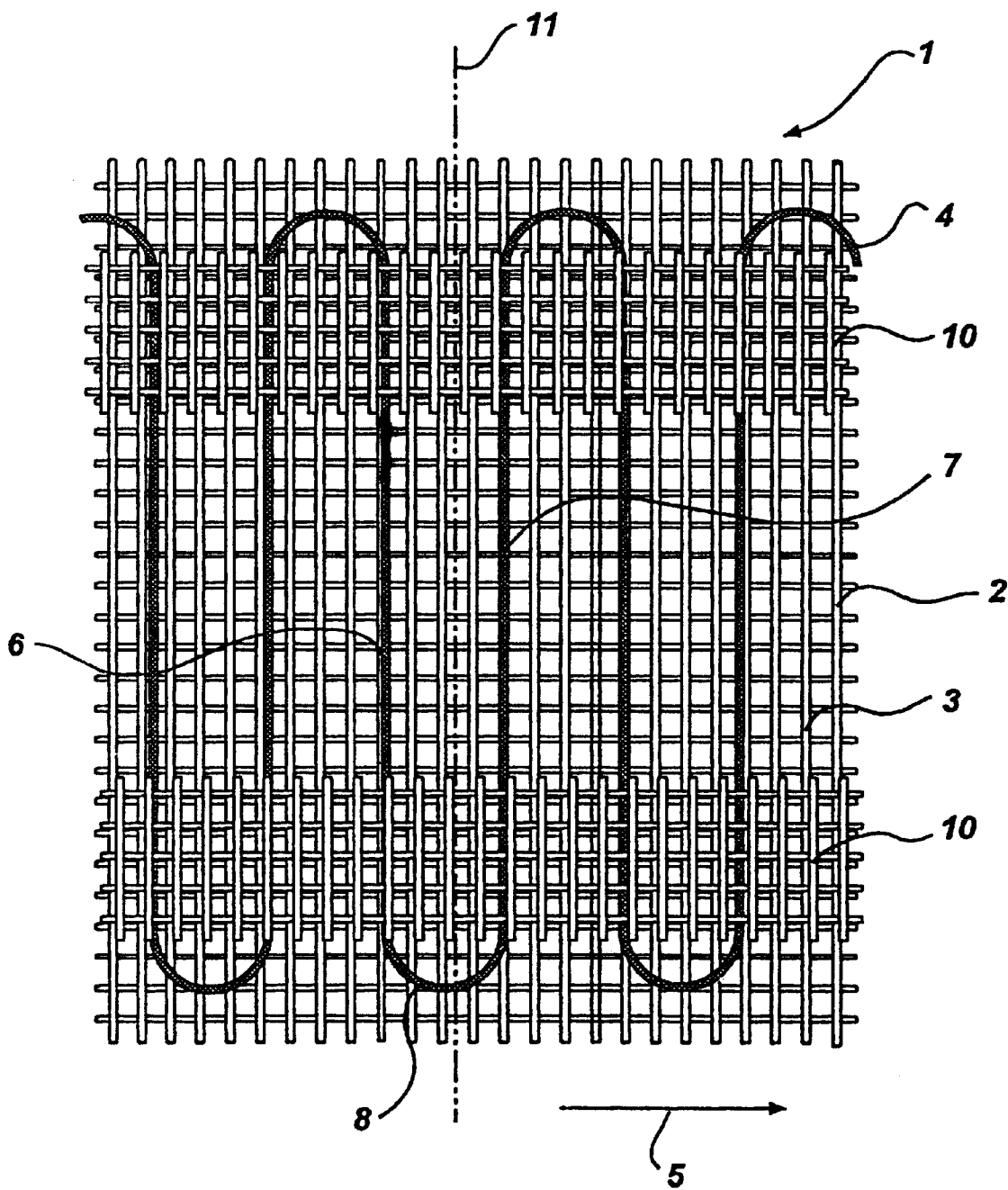
FIG. 1 is a plan view of an embodiment of a heating cable mat according to the present invention.

FIG. 1 is a section of a heating cable mat generally designated 1. The heating cable mat comprises a supporting element in the form of a net 2 which preferably is made of a non-flammable material, for instance polyethylene-coated fibreglass. Naturally, there are also other types of material, which may be suitable or necessary in a certain application. An adhesive material is applied to the upper side 3 of the net 2 to make this side adhesive.

A heating cable 4 of a suitable design, for instance T2BLA™ from Thorin & Thorin, is applied to the adhesive side 3 of the net 2, in the shown example in a serpentine pattern, the cable extending back and forth transversely of the longitudinal direction 5 of the heating cable mat. Two transverse cable portions 6, 7 are interconnected by an arcuate cable portion 8.

The proportions in the shown example between the dimensions of the cable, the width of the heating cable mat, the mesh size of the net etc. should not be considered to limit the invention. On the contrary, a large number of various embodiments may be possible owing to different factors, for instance, the desired effect per square meter, the required strength of the net, the size of the surface of the installation.

On the heating cable 4, a second supporting element 9 may be arranged, which still more fixes the heating cable 4. Conveniently, the supporting element 9 comprises pieces of net 10 which are made of the same type of adhesive net as the net 2. In the shown example, the pieces of net 10 have the shape of two strips which are applied to the net 2 and which extend along the whole length of the net 2. The pieces of net 10 could, of course, just as well have a different shape and different dimensions as long as they contribute to the fixing of the cable 4 to the net 2.

Figure 2:
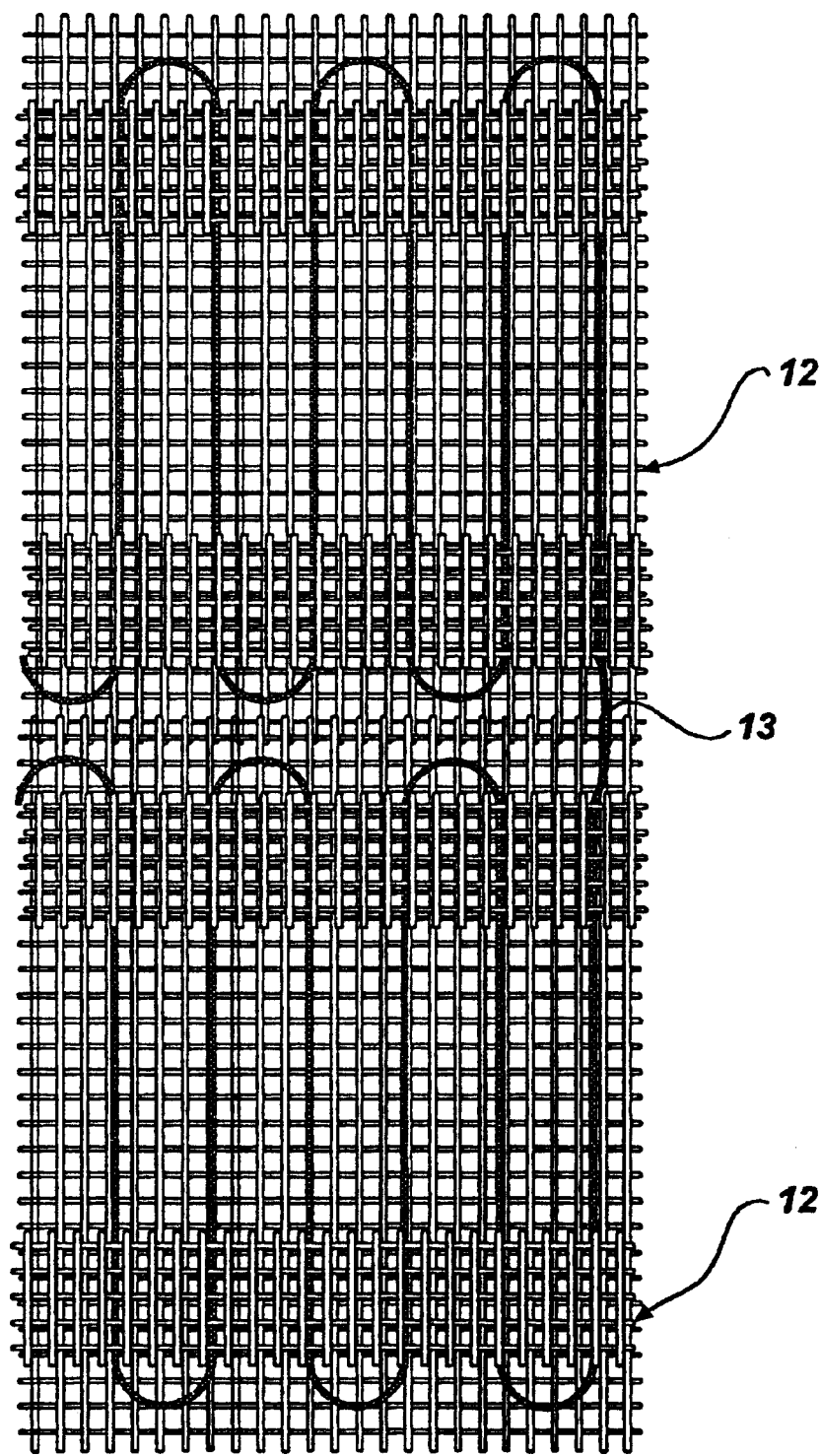
FIG. 2 is a plan view of a heating cable mat in FIG. 1 divided into two parts which have been placed next to one another.

When a heating cable mat 1 is divided into two parts 12 along a section 11 transversely of the longitudinal direction 5, the shown serpentine pattern has the advantage of the heating cable 4 allowing these parts 12 to be placed next to one another (see FIG. 2). The cable portion 8 which previously comprised an arcuate portion 8 is extended and now comprises a connection 13 between the two parts 12. This means that the heating cable mat can easily be adapted to a room of a given size.

Figure 3:
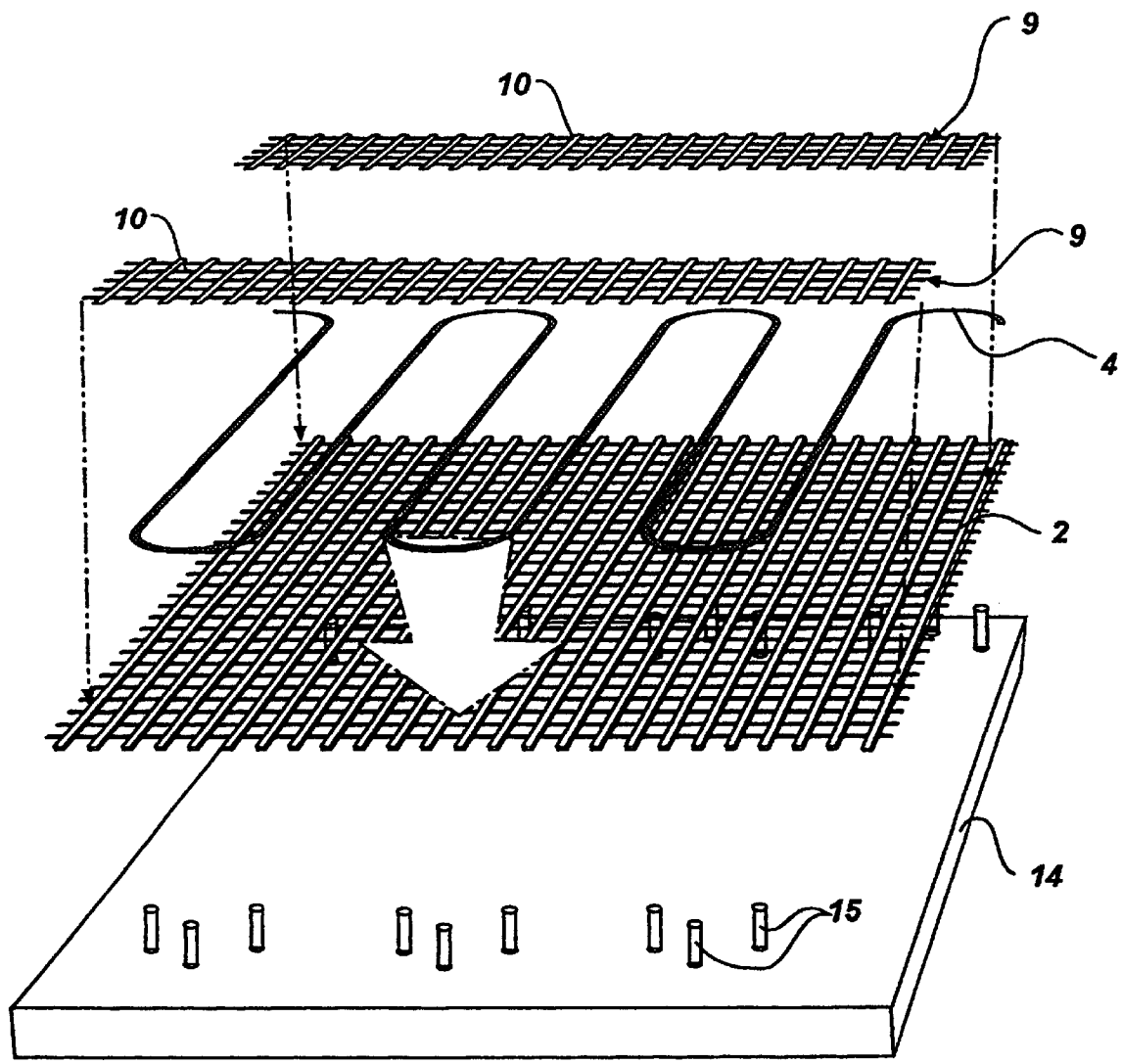
FIG. 3 is an exploded view of the manufacturing of the heating cable mat in FIG. 1.

FIG. 3 shows how a heating cable mat 1 according to the invention is prefabricated. An adhesive net 2 is placed on a template 14 on which the desired pattern is indicated by guide elements 15, for instance, in the form of protruding pegs or pins. When the net 2 has been arranged on the template 14, the guide elements 15 protrude through the net 2. The heating cable 4 is then laid on the net 2 and is wound round the guide elements 15 so that it assumes the shape of the intended pattern, in the shown example a serpentine pattern. Subsequently, the pieces of net 10 in the form of strips may, if required, be applied to the heating cable 4 in the longitudinal direction of the net 2 in order to further fix the heating cable 4. Finally, the heating cable mat 1 is removed from the template 14, preferably by being rolled up.

The template 14 may be of the same length as the total length of the mat 1 or shorter, which means that a method has to be used which allows the heating cable to be continuously arranged in the template 14 and removed therefrom.

A shorter template 14, for instance, may be used repeatedly in order to obtain a heating cable mat 1 of the desired length. According to another variant, the template 14 may be designed as a rotatable cylinder having guide elements arranged in its circumferential surface, and the net 2 may run in a path which touches the surface. When rotating the cylinder, the cable may continuously be arranged adjacent to the guide elements, after which the cable is brought into contact with the net and is attached thereto, and finally follows the path of the net and then is removed from the cylinder.

It has been indicated above that the heating cable mat according to the invention is intended for floor installation. However, nothing prevents the heating cable mat from being used in other contexts, such as in walls and ceilings.

What is claimed is:

1. A prefabricated heating cable mat (1) comprising:
    a first supporting element (2) of a foraminous, flexible material having a self-adhesive surface (3);
    a heating cable (4) which is arranged on the first supporting element (2); and
    a second supporting element (9) of a foraminous, flexible, self-adhesive material having substantially smaller dimensions than the first supporting element (2) is attached to the heating cable mat (1), and the heating cable (4) is located between the two supporting elements (2, 9), wherein the first and second supporting elements are formed of a non-flammable material.

2. The prefabricated heating cable mat as claimed in claim 1, wherein the first supporting element (2) is net-shaped.

3. The prefabricated heating cable mat as claimed in claim 1, wherein the first supporting element (2) is made of a soft plastic material.

4. The prefabricated heating cable mat as claimed in claim 1, wherein the second supporting element (9) comprises one or more strips which extend along the heating cable mat (1).

5. A method for manufacturing a prefabricated heating cable mat (1) which comprises a first supporting element (2) of a foraminous, flexible, self-adhesive material and a heating cable (4), comprising the steps of:
    arranging the first supporting element (2) adjacent to guide elements (15) which indicate a desired pattern for the extent of the heating cable (4);
    arranging the heating cable (4) with the aid of the guide elements (15), so that the heating cable (4) is applied to the first self-adhesive supporting element (2);
    arranging a second supporting element (9) of a foraminous, flexible, self-adhesive material adjacent to the heating cable mat (1), so that the heating cable (4) is located between the two supporting elements (2, 9), said second supporting element having substantially smaller dimensions than the first supporting element; and
    removing the first supporting element (2), the heating cable (4), and the second supporting element adhering thereto from the guide elements (15), wherein the first and second supporting elements are formed of a non-flammable material.

6. The method as claimed in claim 5, wherein the guide elements (15) comprise elongate pegs which penetrate the first supporting element (2) when this is arranged adjacent to the guide elements (15).

7. The method as claimed in claim 5, wherein the second supporting element (9) comprises one or more strips, which extend along the heating cable mat (1).

8. The prefabricated heating cable mat as claimed in claim 2, wherein the first supporting element (2) is made of a soft plastic material.

9. The prefabricated heating cable mat as claimed in claim 2, wherein a second supporting element (9) of a foraminous, flexible, self-adhesive material is attached to the heating cable mat (1), and the heating cable (4) is located between the two supporting elements of (2, 9).

10. The prefabricated heating cable mat as claimed in claim 3, wherein a second supporting element (9) of a foraminous, flexible, self-adhesive material is attached to the heating cable mat (1), and the heating cable (4) is located between the two supporting elements of (2, 9).

11. The method as claimed in claim 6, further comprising the step of arranging a second supporting element (9) of a foraminous, flexible, self-adhesive material adjacent to the heating cable mat (1), so that the heating cable (4) is located between the two supporting elements (2, 9).

12. The prefabricated heating cable mat as claimed in claim 1, wherein the first and second supporting elements are formed of a soft plastic material.

13. The prefabricated heating cable mat as claimed in claim 1, wherein the first and second supporting elements are formed of a plastic coated fibreglass material.

14. The prefabricated heating cable mat as claimed in claim 1, wherein an adhesive is applied on each of the first and second supporting elements on entire sides thereof facing the heating element.

15. The method as claimed in claim 5, wherein the first and second supporting elements are formed of a soft plastic material.

16. The method as claimed in claim 5, wherein the first and second supporting elements are formed of a plastic coated fibreglass material.

17. The method as claimed in claim 5, wherein an adhesive is applied on each of the first and second supporting elements on entire sides thereof facing the heating element.

* * * * *